UNITED STATES PATENT OFFICE.

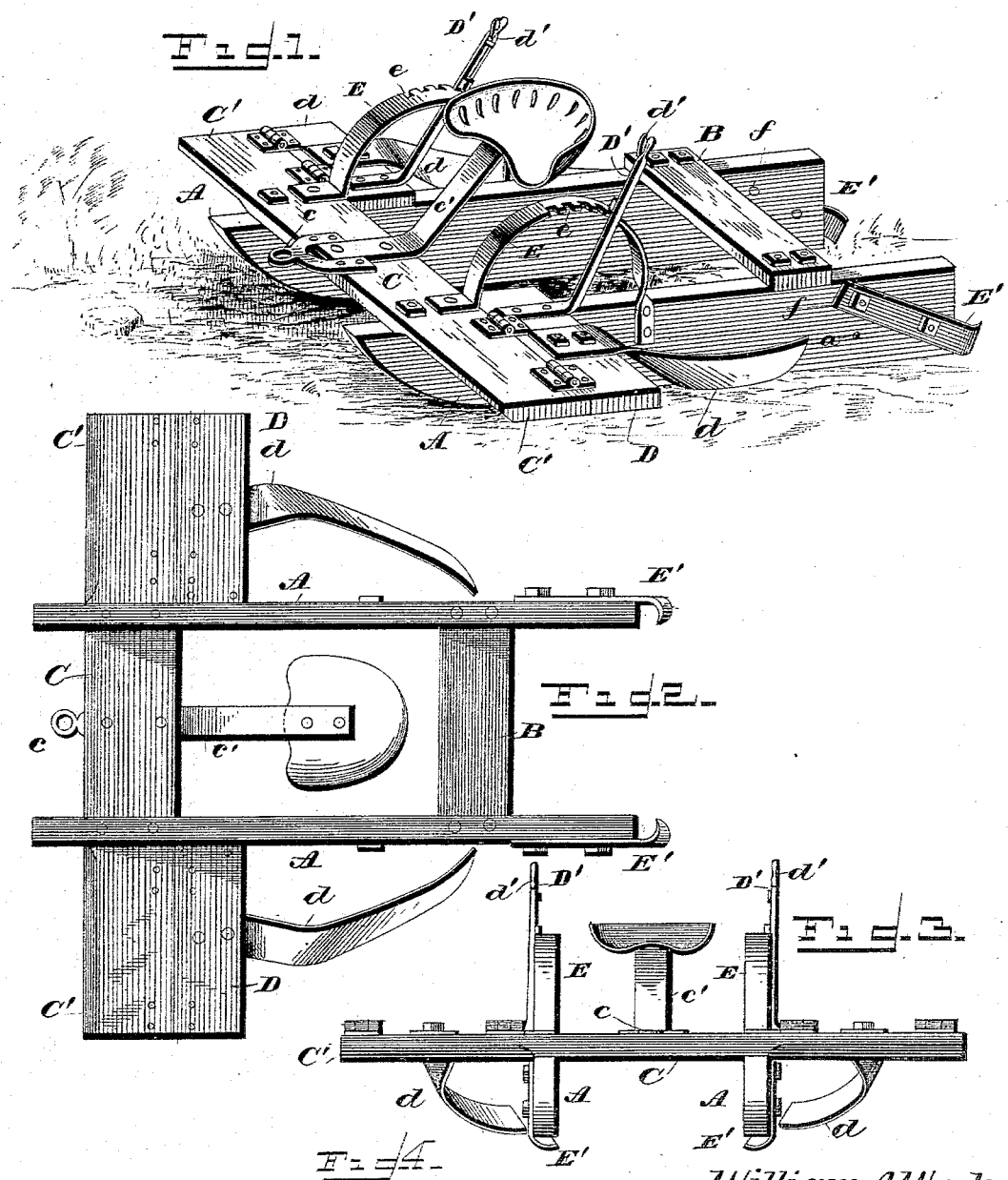

WILLIAM A. WORDEN, OF BEATRICE, NEBRASKA.

CULTIVATOR.

SPECIFICATION forming part of Letters Patent No. 356,674, dated January 25, 1887.

Application filed November 11, 1886. Serial No. 218,619. (No model.)

*To all whom it may concern:*

Be it known that I, WILLIAM A. WORDEN, a citizen of the United States of America, residing at Beatrice, in the county of Gage and State of Nebraska, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of implements known as "lister-cultivators."

The object of the invention is to so construct an implement of this class that while in operation the plants of a row will be protected from clods falling from the sides of the ridges.

A further object is to provide for the vertical adjustment of the stirring-blades; and a further object is to provide for the protection of the plants from rolling clods after the cultivator has passed.

With these objects in view my invention consists in novel arrangements and combinations, which will be fully described in the ensuing specification and claimed in the clauses at the close thereof.

In the accompanying drawings, Figure 1 is a perspective view of a cultivator embodying my improvements. Fig. 2 is a plan view looking at the bottom. Fig. 3 is a front elevation thereof. Fig. 4 is a diagram illustrating the action of the cultivator.

The cultivator-frame comprises two stout runners, A, secured rigidly together at the rear by a cross-bar, B, and at the front by a cross-bar, C, extending a distance beyond the runners, as shown, for a purpose well understood and not requiring special mention in this description. At the forward edge of this cross-bar C, midway between the runners, is secured the usual draft-hook, loop, or clevis, $c$, the seat-standard $c'$ being also, by preference, carried by this cross-bar C, to weight the forward end of the cultivator.

To the rear edge of the extended ends C' of the cross-bar C are hinged wings D, carrying the blades $d$, hand-levers D' being also secured to said wings to enable the driver to raise or lower the blades at will. These levers D' are each provided with a spring-latch, $d'$, to engage the notches $e$ of the segments E, carried by the frame, so that the blades $d$ may be secured in different positions of adjustment to make a deep or shallow cut or for transportation to and from work.

To the outer face of each runner is secured the shank of a grooving hoe or cutter, E', curved, as shown, to work in rear of the runner and throw up a slight ridge of loose soil just inside of the path of the runners. The cutting-edges of the grooving-hoes E' extend slightly below the bottom edges of the runners and cut shallow grooves to where the runners have passed, the soil thus loosened being deposited, as before stated, in slight ridges I, just inside of the paths of the runners. In order that these hoes E' may be rendered inoperative when the machine is being transported from field to field, I provide each runner with an aperture, $a$, so that the forward ends of the shanks of the hoes may be lowered, and again secured by passing the bolt $f$ through the hole $a$ and the hoe-shank. This raises the rear end of the hoe out of contact with the ground.

In operation, the runners A will travel in opposite sides of a furrow, straddling the young plants, and the extended ends C' of the cross-bar C will ride upon the ridges between the furrows, thus tending to cut down or level the tops of said ridges. The blades $d$ cut into the sides of the ridges, loosening the soil and tending to throw it toward the center of the furrow; but as these blades are well forward of the rear ends of the runners A the loose soil will be arrested in its movement, so that any clods or lumps which have been loosened by the blades $d$ will be prevented from rolling onto the plants and crushing them. As the hoes E' at the rear ends of the runners form grooves in the tracks of the runners and ridges at the inner edges of said grooves, the loose material escaping at the rear ends of the runners will fall into said grooves and be checked in its movement toward the plants.

I claim—

1. The combination, with the runners and overhanging cross-bar, of the wings pivotally connected to the rear edge of the cross-bar, the cutters secured to said wings, and the lever and segment for adjusting the position of the cutters.

2. The combination, with the runners and overhanging cross-bar, of the notched segment, the pivoted wings carrying the cutters and adjusting-levers, and the adjustable grooving-hoes.

In testimony whereof I affix my signature in presence of two witnesses.

WILLIAM A. WORDEN.

Witnesses:
 SAMUEL RINAKER,
 F. B. SHELDON.